United States Patent [19]

Trumbull et al.

[11] Patent Number: 5,795,228
[45] Date of Patent: Aug. 18, 1998

[54] INTERACTIVE COMPUTER-BASED ENTERTAINMENT SYSTEM

[75] Inventors: Douglas Trumbull, Southfield, Mass.; Marty Behrens, Culver City, Calif.; Erich Greenebaum, Great Barrington, Mass.

[73] Assignee: Ridefilm Corporation, Lee, Mass.

[21] Appl. No.: 675,351

[22] Filed: Jul. 3, 1996

[51] Int. Cl.⁶ .................................. G06F 13/00
[52] U.S. Cl. .................................. 463/42
[58] Field of Search .................. 463/40, 41, 42; 273/429; 379/202, 203, 204, 205

[56] References Cited

U.S. PATENT DOCUMENTS

| | | | |
|---|---|---|---|
| 5,624,316 | 4/1997 | Roskowski et al. | 463/41 |
| 5,636,209 | 6/1997 | Perlman | 463/42 |
| 5,641,319 | 6/1997 | Stoel et al. | 463/42 |

Primary Examiner—George Manuel
Attorney, Agent, or Firm—McCormick, Paulding & Huber

[57] ABSTRACT

An interactive computer-based entertainment system interacts with a user and presents to the user an interactive show comprising audio, video images and computer-generated graphical images. The entertainment system comprises a user interface, a database, a show controller and an activity server. The user interface receives user input signals indicative of user input actions, and further presents user output signals to the user. The user output signals are indicative of the audio, video and computer graphical images generated by output devices. The database receives the user input signals and generates in dependence thereupon database signals which are indicative of an informational record of the user. The informational record is indicative of user characteristics which serve to uniquely identify the user. The show controller generates a first set of show control signals indicative of the audio, the video images and the computer-generated graphical images of the show. The activity server receives the user input signals, the database signals and the show control signals, and generates in dependence thereupon activity server signals for directing presentation of the user output signals by the user interface. The activity server signals are presented to the show controller and the show controller generates in dependence thereupon a second set of show control signals indicative of the audio, the video images and the computer-generated graphical images of the show which are adjusted in accordance with the user input actions.

20 Claims, 7 Drawing Sheets 5,795,228

1

INTERACTIVE COMPUTER-BASED ENTERTAINMENT SYSTEM

FIELD OF THE INVENTION

The present invention relates to entertainment systems and more particularly to interactive entertainment systems involving computer image generation and control.

BACKGROUND OF THE INVENTION

Conventional audio-visual entertainment systems are exemplified by media such as cinema movie productions. A movie shows pre-recorded audio and video images to an audience. The audience does not interact with the movie, and cannot control the way in which events transpire in the movie. The movie is furthermore a one-way display seen from a third-person point of view, instead of a first-person point of view where the audience is a part of the movie. For example, the characters of the movie do not address the audience, and movie scenes can rapidly change to show images from several different vantage points.

More advanced audio-visual entertainment systems offer the partial integration of the audience with a movie-type display, and are often characterized as "movie rides". One such movie ride is the entertainment system in operation at Universal Studios in Orlando, Fla. under the name "The Back To The Future Ride". In these movie rides, an audience is shown pre-recorded audio and video scenes, much like a conventional movie. However, unlike a movie, the audience is a part of the movie in that visual images are directed to the audience as if they were a part of the scene. For example, objects in the scenes seem to approach the audience, then swerve away before "colliding" with the audience. All scenes are seen from a first-person point of view, rather than from the viewpoint of a detached third-person observer. Though the audience is integrated into the scenes, these movie rides are still much like movies in that there is no user interaction or control over the events as they transpire.

A type of entertainment system known as an interactive film is also like a movie but accepts input commands from a player. The interactive film proceeds through a scene until a point at which a user choice is required. Depending on the choice, the movie continues at one of a number of pre-recorded scenes. For example, at the end of one scene, the user may be required to choose whether a character enters a car and dives away or stays where he is. If the user chooses to drive away, then a pre-recorded scene is shown in which the character drives away, while a pre-recorded scene showing the character remaining where he is not shown. Thus, the user choices direct the course of the movie and determine its outcome.

A video game is a known entertainment system in which a player exerts control over the game environment. The player interacts in a relatively crude manner with a computer-generated image, typically by pressing buttons or operating a joystick control. The player thereby controls how events in the game transpire, such as where a game character travels on a computer-generated "world". The computer-generated images are typically seen from a third-person viewpoint, wherein the player is not a part of the scenes. However, some video games generate images which are seen from the first-person viewpoint. For example, images of game characters such as enemy soldiers seem to approach the player and fire weapons in his direction. Video games also support multiple players, typically between two and four, who can play either in cooperation or against each other as opponents.

2

A more advanced type of entertainment system is a virtual reality game. Similar to the video game system described hereinabove, a virtual reality game presents computer-generated graphics to a player who is a part of a scene. A computer running virtual reality software renders three-dimensional graphical objects which collectively form a virtual world with which the player interacts. The player must wear bulky equipment, such as a large helmet-mounted computer monitor directly in front of his field of vision. The helmet prevents the player from seeing anything but the image of the virtual world on the monitor. The player also wears a belt, glove or other objects which transmit the player's body movements to a sensor. The player is restricted to a small area, such as a booth, where the sensor tracks the movements of transmitters which the player wears.

The player interacts with the virtual world through his body movements, thereby controlling how events transpire. For example, a belt which the user wears is equipped with a transmitter that emits proximity signals. The sensor receives the proximity signals and detects the position of the belt, and therefore whether the user is upright or is bent at the knees in a crouched position. The sensor does not provide any other information on the identity of the player. A person in the booth and detected by the sensor is indistinguishable from any other person who is in booth at another time. Most virtual reality games support multiple players, typically between two and four, who play simultaneously either in cooperation or against each other as opponents in the virtual world.

The above-described known entertainment systems, due to technological and historical restrictions, lack many desirable features. Conventional entertainment systems do not generate images which significantly combine three-dimensional computer graphics, pre-recorded audio and video, and live audio and video. Though some movies integrate computer graphics, it is an expensive and time consuming process which requires separate filming of a movie followed by subsequent integration by a team of computer graphics specialists. Similarly, although some video games utilize segments of pre-recorded audio and video, known video games do not support long, pre-recorded scenes or live video which is arbitrarily inserted into computer graphics.

Another drawback of known entertainment systems is that they either do not support audience interaction, like movies and movie rides, or they do not support interaction by a significant number of players, like video games and virtual reality games. Generally, video games support few players since many players cannot be comfortably located in front of a video game monitor. Similarly, virtual reality game systems do not support many concurrent players due to the large number of sensor booths required to hold the players.

A further drawback of known entertainment systems is that they do not feature live actors, but instead can only show the same pre-recorded video or unrealistic computer graphics. Without a live actor as part of the scenery, scenes are difficult to change significantly and are therefore not as flexible in their format. Furthermore, an entertainment system without a live actor is less interactive.

Another drawback of known entertainment systems is that multiple users cannot simultaneously interact with a "host", i.e. a live or intelligent, computer-generated agent which interacts with the user. A host receives input from each user and provides output to each user such as answering questions or changing a game in response to user requests.

Still another drawback of known entertainment systems is that they cannot serve remotely located players. Conventional video games and virtual reality games require all players to be located at the same site, typically in the same room.

SUMMARY OF THE INVENTION

It is an object of the present invention to provide an entertainment system which features pre-recorded scenes, live video and computer graphics in an interactive environment.

It is a further object of the present invention to provide an entertainment system which supports a substantial number of concurrent users.

It is another object of the present invention to provide an entertainment system which provides entertainment to users who are remotely located from the entertainment system, as well as to users who are located near the entertainment system.

It is still another object of the present invention to provide an entertainment system which connects users with each other, with their environment, and with various media in new and stimulating ways.

According to the present invention, an interactive computer-based entertainment system which interacts with a user who has user characteristics, and which presents to the user an interactive show comprising audio, video images and computer-generated graphical images, comprises a user interface, a database, a show controller and an activity server. The user interface receives user input signals indicative of user input actions, and further presents user output signals to the user. The user output signals are indicative of the audio, video and computer graphical images generated by output devices. The database receives the user input signals and generates in dependence thereupon database signals which are indicative of an informational record of the user. The informational record is indicative of user characteristics which serve to uniquely identify the user. The show controller generates a first set of show control signals indicative of the audio, the video images and the computer-generated graphical images of the show. The activity server receives the user input signals, the database signals and the show control signals, and generates in dependence thereupon activity server signals for directing presentation of the user output signals by the user interface. The activity server signals are presented to the show controller and the show controller generates in dependence thereupon a second set of show control signals indicative of the audio, the video images and the computer-generated graphical images of the show which are adjusted in accordance with the user input actions.

According to another aspect of the present invention, a method for interacting with a user of an entertainment system, in which the user has user characteristics, and which entertainment system presents to the user an interactive show comprising audio, video images and computer-generated graphical images, comprises the steps of receiving user input signals indicative of user input actions; presenting user output signals to the user, which user output signals are indicative of the audio, video and computer graphical images generated by output devices; receiving the user input signals; generating, in dependence upon the user input signals, database signals which are indicative of an informational record of the user, which informational record is indicative of user characteristics which serve to uniquely identify the user; generating a first set of show control signals indicative of the audio, the video images and the computer-generated graphical images of the show; receiving the user input signals, the database signals and the show control signals, and generating in dependence thereupon activity server signals for directing presentation of the user output signals by the user interface means; and generating, in dependence upon the activity server signals, a second set of show control signals indicative of the audio, the video images and the computer-generated graphical images of the show which are adjusted in accordance with the user input actions.

DESCRIPTION OF PREFERRED EMBODIMENT

Figure 1:
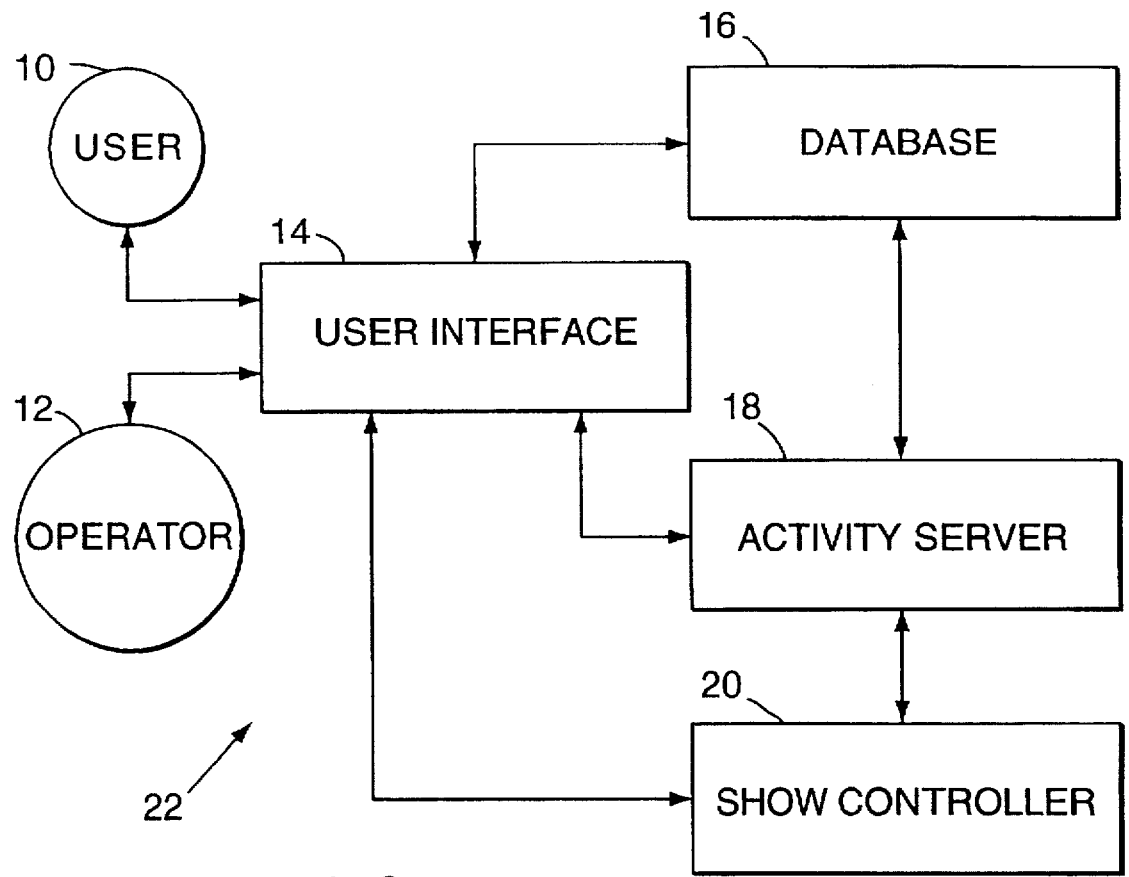
FIG. 1 is a schematic illustration of components of an entertainment system provided in accordance with the present invention.

FIG. 1 shows a schematic illustration of functional components of an entertainment system 22 provided in accordance with the present invention. Two types of people interact with the entertainment system 22, a user 10 and an operator 12. Though for clarity a single user and operator are illustrated in FIG. 1, the entertainment system 22 supports several operators as well as an audience of several simultaneous users. The user 10 is typically a customer who pays to use the entertainment system 22, i.e. to participate in a "show" or "game". Thus, an audience is not a passive collection of people who simply watch a performance. Instead, the audience is a collection of active participants. The operator 12 is a staff member responsible for operating the entertainment system 22 and assuring that it performs as intended to entertain the user 10. The show is a combination of a performance by a "host" character and a virtual "world" which comprises audio, video and computer-generated graphics. The graphics in the world typically represent three-dimensional objects, such as walls, windows, mirrors, chairs and television screens, but may also be other types of graphics such as two-dimensional objects or text.

The user 10 and operator 12 interact with the entertainment system 22 through a User Interface 14 which is described in further detail hereinbelow. The User Interface 14 receives input signals from the user 10 and operator 12 such as signals from a button, touch screen, signal transmitter or other equivalent device. The User Interface 14 furthermore provides the user 10 and operator 12 with output, such as audio, video and computer graphics signals directed to peripheral output devices such as speakers, projectors and computer monitors. The User Interface 14 furthermore exchanges signals with a Database 16, an Activity Server 18 and a Show Controller 20, each of which is described hereinafter.

The conceptual separation of the User Interface 14 from the other components 16, 18 and 20 of the entertainment system 22 guarantees system modularity. As is known in the art, a modular system is advantageous because modifications to one component, or module, do not affect the remaining modules. Thus, future technological advances in User Interface design may be incorporated into the entertainment system 22 without significantly redesigning the other components 16, 18 and 20. Thus, the entertainment system 22 provided in accordance with the present invention is flexible and may easily respond to an audience's continually increasing levels of expectation and sophistication.

Figure 2:
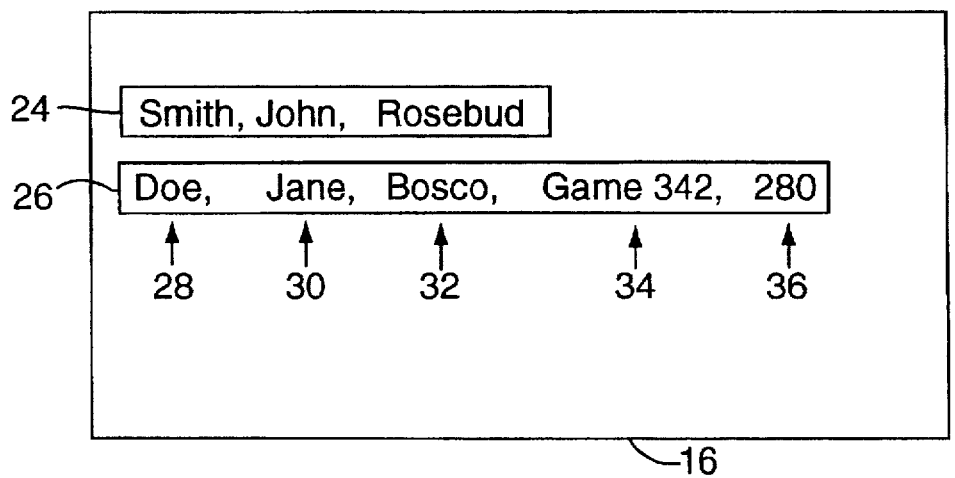
FIG. 2 is a schematic representation of information maintained in a database in the entertainment system of FIG. 1.

FIG. 2 is a schematic representation of information maintained in the Database 16. The Database 16 retains database signals indicative of an informational record of each user who either has used or is currently using the entertainment system 22. The database signals in the Database 16 may be selectively accessed and retrieved, as well. A record contains an extendible set of at least basic user information, such as a name and a password, which serve to uniquely identify the user. Additional information in a record may include a secondary identification, such as a voice print, fingerprint or hand print, address, phone number, age, income, gender, social security number, marital status, family information, interests, hobbies, credit card number, spending patterns, usual food and drink orders, favorite activities and games, game scores and proficiencies. A user record grows as the Database 16 acquires additional information about the user, and in terms of the art the record is known as a dynamic structure.

Information may be acquired either directly, such as user input, or indirectly, such as by extrapolating from game performance and other observed user activities. In the preferred embodiment, a record contains information on all transactions and activities which a user performs with the entertainment system 22, whether on location or remotely. Such additional user information provides the entertainment system 22 with user characteristics, thereby allowing the entertainment system 22 to adapt to the user characteristics. Such adaptation to user characteristics may include anticipating frequently performed user actions and otherwise customizing the entertainment system 22 to fit each user's preferences. In alternative embodiments, the Database 16 contains not only information related to users but also other information required for operation of the entertainment system 22.

As shown in FIG. 2, two records 24 and 26 exist in the Database 16. Each record includes a plurality of fields, such as a last name field 28, a first name field 30, a password field 32, a favorite game field 34 and a highest score field 36. The record 24 comprises less information than the record 26. The record 24 only has information in fields 28, 30 and 32, while the record 26 has information in fields 28, 30, 32, 34 and 36. The difference in the amounts of information in the two records 24 and 26 indicates that record 24 is associated with a user who is newer and has not interacted as much with the entertainment system 22 as has the user associated with the record 26.

The primary purpose of the Database 16 is to personalize the entertainment experience of each user. The Database presents the database signals to the User Interface 14 and to the Activity Server 18 which use the database signals to facilitate both fiscal and game-oriented user transactions in a manner described hereinbelow. Furthermore, by accessing the database signals through the User Interface 14, a user may access information about friends and game opponents. Accordingly, the User Interface 14 may selectively receive signals indicative of certain database record fields. However, some fields in a record contain confidential information. Accordingly, when a first user requests information about another user, the Database 16 only presents signals indicative of certain database record fields to the User Interface 16, such as name and interest fields, but signals indicative of other fields are not accessible by other users, such as social security number and credit card number fields.

Referring again to FIG. 1, the Activity Server 18 generates and directs the course of a show which the user views. The Activity Server 18 comprises real-time software running on a computing platform such as a Silicon Graphics Onyx class computer. As described hereinafter, the Activity Server 18 controls the other components of the entertainment system 22 in providing a show to the user. The Activity Server 18 provides a show in accordance with prescribed algorithms indicative of activities which occur during the show, such as whether to prompt users for input, what lighting and audio operations to execute and what images to generate. In the preferred embodiment, the Activity Server 18 need not perform the same show twice, but instead accepts input from users and operators to perform shows which vary in length and composition each time.

Figure 3:
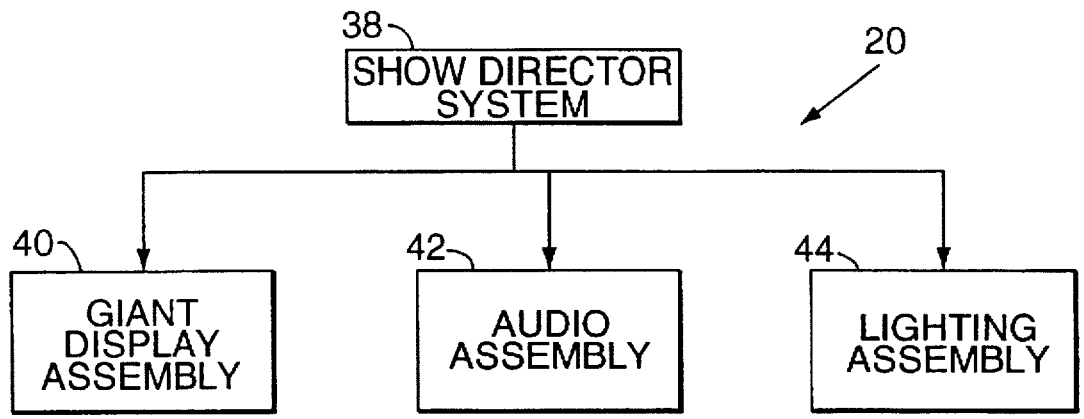
FIG. 3 is a schematic illustration of components of a Show Controller of the entertainment system of FIG. 1.

FIG. 3 illustrates in schematic form functional components of the Show Controller 20. While the Activity Server 18 provides logical control by directing a show, the Show Controller 20 provides physical control by controlling physical devices. A Show Director System 38 comprises real-time software running on a computing platform such as a Silicon Graphics Onyx class computer. The Show Director System 38 generates show control signals for controlling a Giant Display Assembly 40, an Audio Assembly 42 and a Lighting Assembly 44. The Show Director System 38 thereby controls physical devices involved in a show, such as doors, lights, and image and sound playback apparatus, and thus "performs" the show. By varying the actions of the Giant Display Assembly 40, Audio Assembly 42 and Lighting Assembly 44, the Show Director System 38 can perform a variety of different shows.

Figure 4:
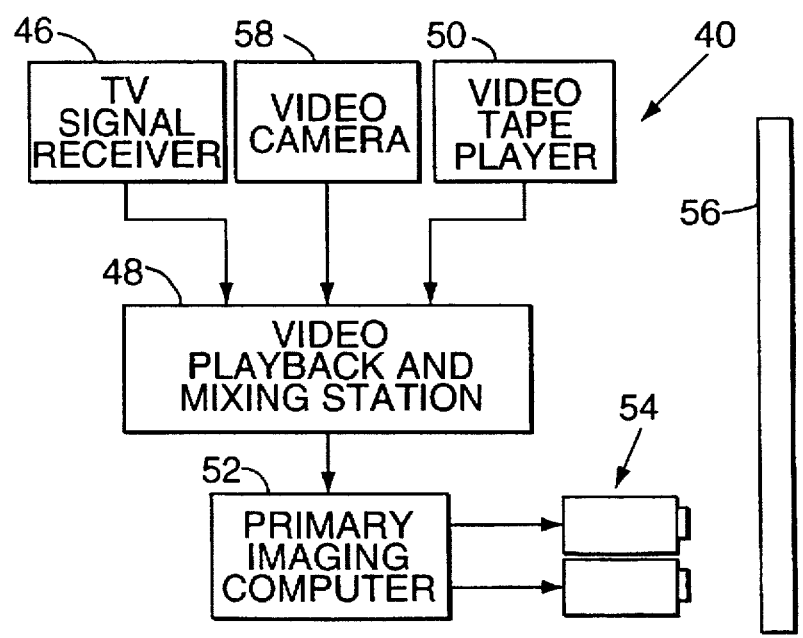
FIG. 4 is a schematic illustration of components of Giant Display Assembly of the Show Controller of FIG. 3.

FIG. 4 shows the Giant Display Assembly 40 in greater detail. A Video Playback and Mixing Station 48 receives signals indicative of video images from video sources such as a television signal receiver 46, a video camera 58 and a video tape player 50. In the preferred embodiment, the Video Playback and Mixing Station 48 can receive signals from twenty sources. The Video Playback and Mixing Station 48 processes the received signals and generates in dependence thereupon edited video signals, such as NTSC video signals, which are indicative of a plurality of prescribed video images which are in a prescribed arrangement with respect to each other. The video images may be in a prescribed spatial and temporal arrangement. The edited video image comprises portions of the video images from the video sources, and the portions may be altered, such as reduced in image size. The Station 48 presents the edited video signals to a Primary Imaging Computer 52.

The Primary Imaging Computer 52 is a highly specialized graphics processing computing platform which runs software for real-time rendering of three-dimensional computer graphics and integrating the graphics with the received video signals. In the preferred embodiment, the Primary Imaging Computer is a Silicon Graphics Onyx class computer with three Infinite Reality Image Generators. The Primary Imaging Computer can render images of textured polygons for three-dimensional image generation as well as map video into a three-dimensional world in real-time. The video signals from the Video Playback and Mixing Station 48 are typically stored in a portion of memory on the Primary Imaging Computer 52 known as texture memory. The Primary Imaging Computer 52 maps the signals in texture memory to signals indicative of surfaces on a three-dimensional geometry data set of polygons, resulting in a composite image of video mapped onto a world of three-dimensional computer-generated graphics. The Primary Imaging Computer 52 renders at high resolution, preferably 3600×1000 pixels.

The Primary Imaging Computer 52 generates signals indicative of the host image and the virtual world, including mapping recorded and real-time video onto images of surfaces in the world such as images of walls, windows, mirrors, and large television screens. The Primary Imaging Computer 52 furthermore controls the objects in the world in a manner described hereinbelow. The world comprises portions, i.e. channels, which may be of differing formats such as live video, pre-recorded video, text, two and three-dimensional graphics, and an animated host image. The Video Playback and Mixing Station 48 relieves the Imaging Computer 52 of a substantial amount of computational processing by performing all video processing tasks.

The Primary Imaging Computer 52 presents signals indicative of the world image to High Definition Projectors 54 which project the image onto a main screen 56. In the preferred embodiment, the High Definition Projectors 54 are Ampro light valve devices which project an image at 2500 lumens. In an alternative embodiment, the High Definition Projectors 54 are CRT arrays (video cubes) manufactured by Hitachi Corporation. The image resolution is preferably 3600 horizontal lines, and the image aspect ratio is panoramic, for example four times as wide as high. The image on the main screen is preferably forty feet wide and ten feet high. Further in the preferred embodiment, there are three channels and two projectors per channel, providing a total of six projectors and 15,000 lumens.

Figure 5:
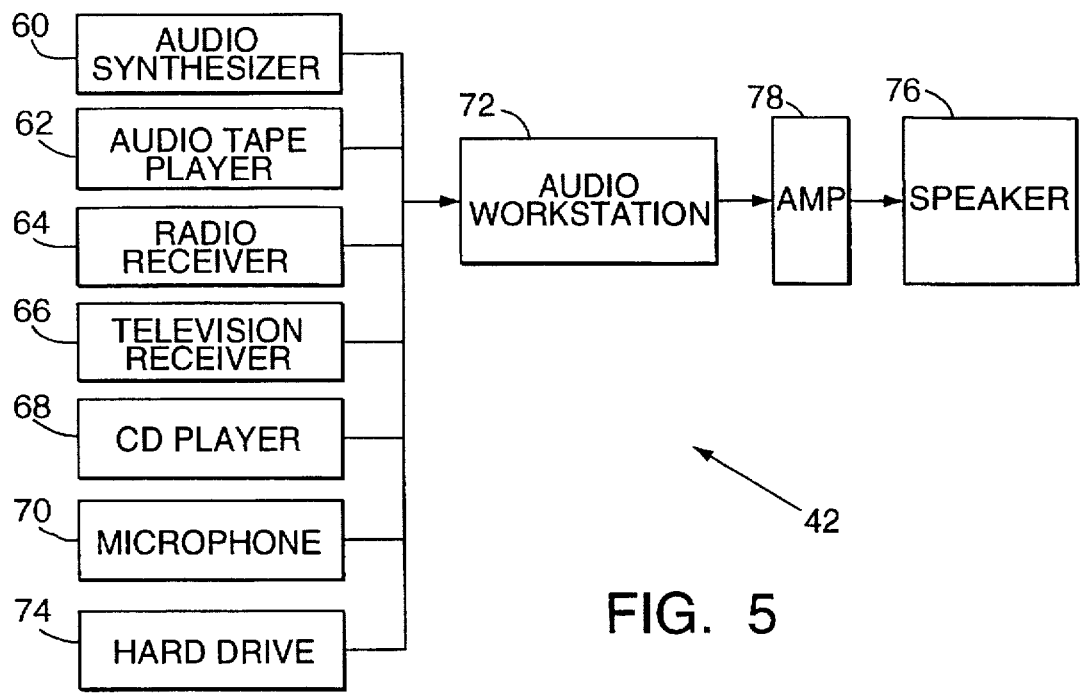
FIG. 5 is a schematic illustration of components of Audio Assembly of the Show Controller of FIG. 3.

FIG. 5 illustrates the Audio Assembly 42 in greater detail. The Audio Assembly 42 comprises hardware and software for generating and amplifying sounds and audio signals indicative of sounds. An audio workstation 72 receives audio signals from sources such as a sound effects synthesis device 60, an audio tape player 62, a radio receiver 64, a television receiver 66, a compact disk (CD) player 68, a hard drive 74 and a microphone 70. The audio workstation 72 is preferably a desktop model personal computer with digital signal processing (DSP). The audio workstation 72 combines and edits the received audio signals to generate combined, edited audio signals which are presented through amplifiers 78 to speakers 76. The amplifiers 78 and speakers 76 need not produce extremely high volume, but are high fidelity and supports three-dimensional sound reproduction. Software which runs on the audio workstation 72 is preferably based on existing programming and application environments such as Max, M, and Studio-Vision software provided by Opcode, Inc.

The Lighting Assembly 44 comprises robotic xenon light sources which operate in accordance with light source command signals received from the Show Director System 38. The Show Director System 38 thereby controls the intensity of each light source, as well as how each light source tilts, pans, focuses and mixes colors. The Show Director System 38 synchronizes the operation of the light sources with the operation of the Giant Display Assembly 40 and the Audio Assembly 42, thereby enhancing the user's sensory stimulation.

Figure 6:
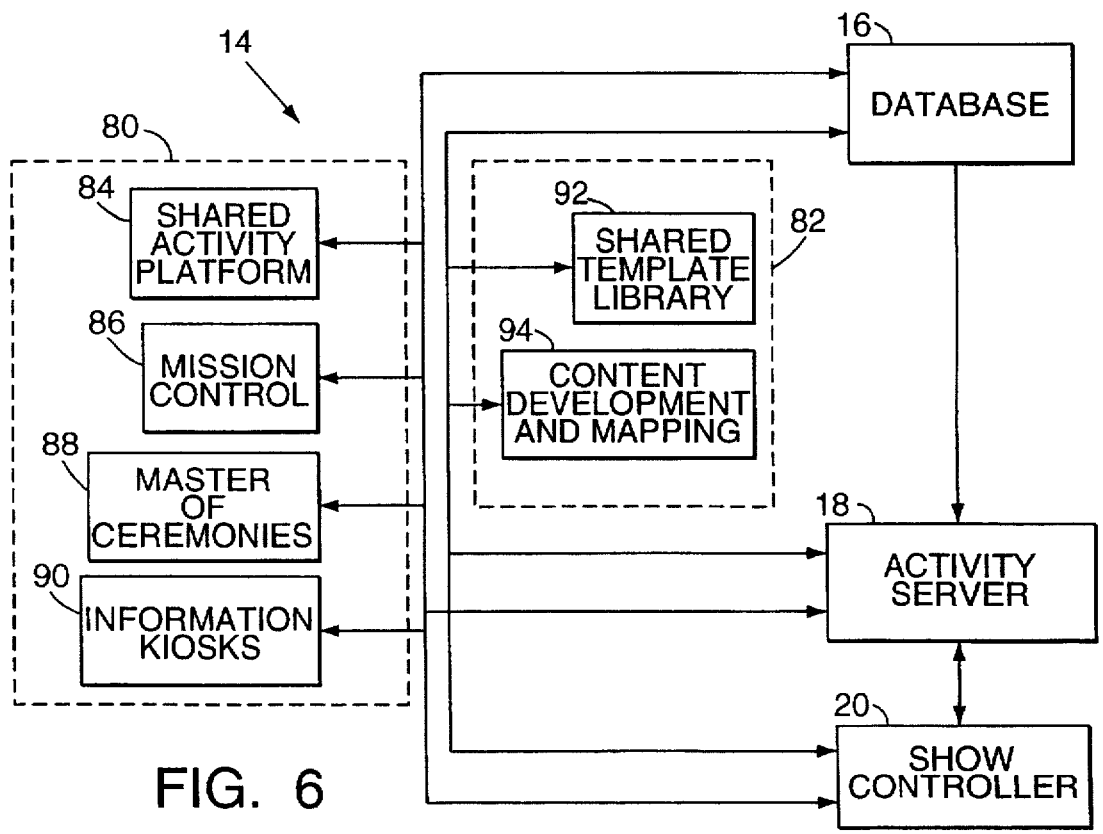
FIG. 6 is a schematic illustration of components of a User Interface of the entertainment system of FIG. 1.

Referring to FIG. 6, the User Interface 14 comprises an Editing system 82 for creating shows and a Runtime system 80 which is in use during performance of a show. During show performance, the Runtime system 80 and the Editing system 82 operate independently of each other, but share resources such as the Database 16. The Runtime system 80 comprises an Information and Registration Kiosk 90, a Shared Activity Platform 84, a Mission Control subsystem 86 and a Master of Ceremonies subsystem 88.

Figure 7:
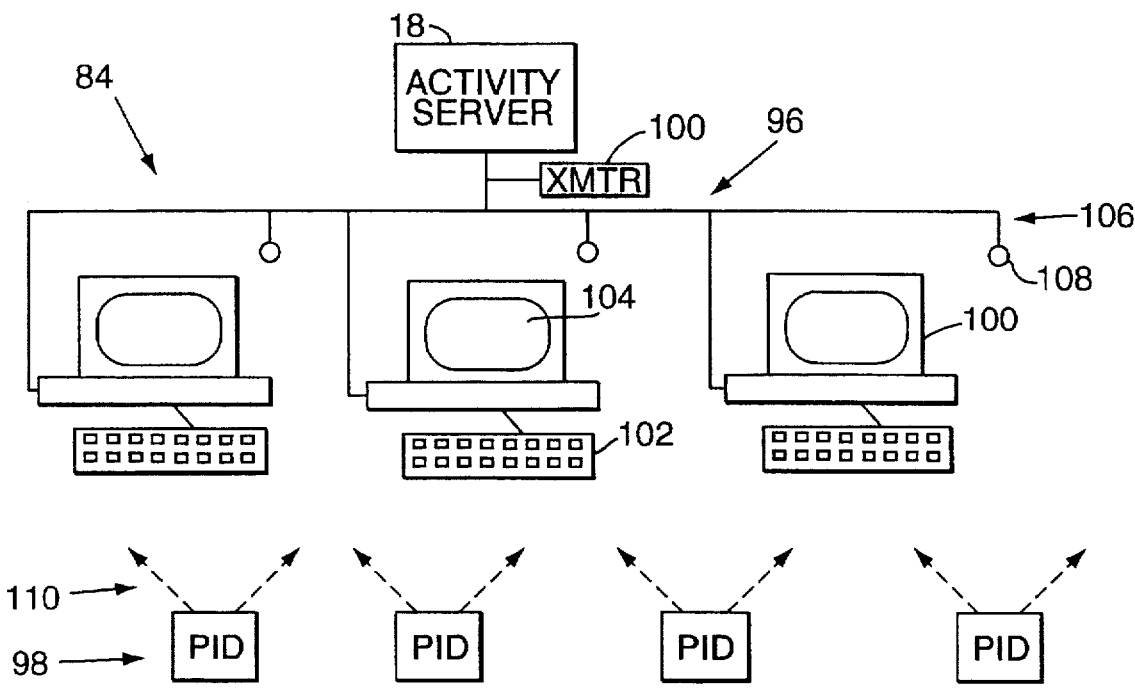
FIG. 7 is a schematic illustration of components of a Shared Activity Platform of the User Interface of FIG. 6.

FIG. 7 shows in greater detail a schematic illustration of the Shared Activity Platform 84, which comprises a plurality of Personal Interaction Devices (PIDs) 98 and a network of multi-media personal computers (PCs) 96 in signal communication with the Activity Server 18. The Activity Server 18 coordinates the signals sent to and received by the PIDs 98 and PCs 96, thereby directing the interaction between the PIDs 98 and PCs 96 in a manner described hereinbelow. In the preferred embodiment, there are one hundred thirty-three multi-media PCs and six hundred PIDs 98. Each PC is configured for either single-user or group access, both of which are described hereinbelow. Each PC is housed in an attractive station which only reveals to users a high resolution monitor 100 and input devices, such as a keypad 102 and a touch screen 104. The PCs provide an interface from which users may either participate in events transpiring on the main screen 56 or may perform separate operations such as searching a global computer communications network, such as "the Internet", or playing a game unrelated to a game shown on the main screen. The activities a user performs on the PC typically relate to a game, such as searching the Internet for information needed to solve a game puzzle. Thus, the PC does not merely mimic the image on the main screen 56, but allows users to freely integrate other activities into the show as desired. Multiple PCs allow different users to pursue different activities, much like multiple television sets in a home allows several people to cater to their individual preferences.

Though each PC supports multimedia operations, the PCs do not require a hardware graphics accelerator component. Conventional PCs, such as those based on a 586-type microprocessor, are sufficiently powerful for moderate graphics processing such as the three-dimensional real-time rendering required for the Shared Activity Platform 84. However, in an alternate embodiment, each PC is a workstation such as a Silicon Graphics High Impact class computer which, though more expensive, performs more complex three-dimensional graphics operations.

A PID is a small, light-weight, unobtrusive object carried by each user for identifying the user to the Entertainment System 22 as well as indicating the location of the user to the Entertainment System 22. In the preferred embodiment, a PID is a hand-held device which intermittently generates a proximity signal, such as an infrared or radio frequency signal, indicated in FIG. 7 by dashed lines 110. The proximity signals of each PID are encoded with the identity of the user who carries; the PID. Signal encoding techniques are known in the art, and include amplitude modulation and frequency modulation of a carrier frequency signal. When a user registers with the entertainment system 22, a PID carried by the user is configured to generate the encoded proximity signals, as described hereinbelow. A PID Tracking Apparatus 106 which is in signal communication with the Activity Server 18 receives the encoded proximity signals. The Activity Server 18 thereby "tracks" each user carrying a PID, as described hereinbelow.

Figure 11:
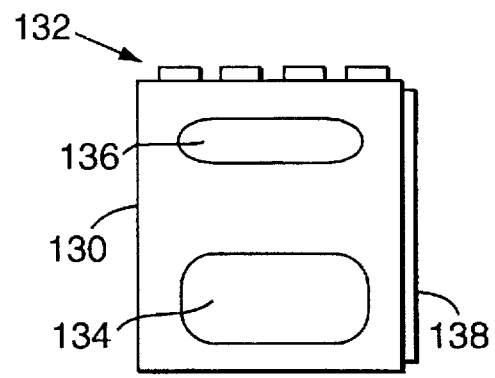
FIG. 11 is a schematic illustration of a Personal Interaction Device of the Shared Activity Platform of FIG. 7.

Referring to FIG. 11, a PID 130 includes buttons 132, preferably four buttons, for signaling special commands to the PID Tracking Apparatus 106. Such commands may indicate a vote of the user or that the user requires assistance. When a user presses a button on his PID, the PID transmits through an antenna 133 proximity signals which are encoded with the identity of the user and the button which he pressed. The PID Tracking Apparatus 106 receives the proximity signals from the PID and thereby detects the button which the user pressed. The buttons 132 allow a user to provide input to the entertainment system 22 even if the user is not near a PC. The buttons 132 also provide a very simple way for the user to provide input to the entertainment system 22. For example, the host may can solicit a vote from all users, wherein users desiring a first choice press a first PID button and users desiring a second choice press a second PID button.

Each PID also has an audio output 134 for emitting audio sounds. In alternative embodiments, each PID has a buzzer, a beeper or equivalent device to provide feedback to the user. A receiver circuit (not shown) in the PID receives PID command signals, such as a radio frequency signals, presented by the PID Tracking Apparatus 106 in a manner described hereinbelow. The PID command signals are indicative of a command from the Activity Server 18, such as a command to activate the buzzer. A PID furthermore includes a microphone 136 and an internal storage medium (not shown) for recording sounds from the user. The internal storage medium is also in signal communication with the activity server through the PID Tracking Apparatus 106. The PID, upon a receiving prescribed PID command signals from the PID Tracking Apparatus 106, generates stored sound signals indicative of the sounds stored on the internal storage medium. The stored sound signals are presented to the PID Tracking Apparatus 106 and therethrough to the Activity Server 18. The Activity Server 18 can use the stored sound signals, for example by broadcasting a recorded sound to all users or integrating the stored sound signals into a show.

As described hereinabove, when a user registers with the entertainment system, a PID carried by the user is configured to generate proximity signals encoded with the identity of the user. It is preferable that a PID is configured by downloading software into the PID. For example, the PID may receive radio or infrared PID command signals indicative of encoding software for encoding the proximity signals with the user identity. The proximity signals are thereafter encoded with the user identity in accordance with the encoding software. In another embodiment, the PID is configured through hardware modifications, such as inserting into the PID a signal generator chip which directs the generation of encoded proximity signals.

The PID Tracking Apparatus 106 comprises a plurality of proximity sensors 108 and at least one transmitter 109. The PID Tracking Apparatus 106 is also in signal communication with the Activity Server 18, such as through a conventional Ethernet wired network. Each of the plurality of proximity sensors 108 receives proximity signals generated by PIDs which are within a prescribed distance of the proximity sensor. The proximity sensor which receives proximity signals presents to the Activity Server 18 signals indicative of the location of the detected proximity signals and the identity encoded therein. The transmitter 109 generates PID command signals, such as infrared or radio frequency signals, which the PIDs receive and process as described hereinabove.

The PID Tracking Apparatus 106 tracks the location of each user carrying a PID. Precise position resolution is not required in the PID Tracking Apparatus 106, so resolution of a user location to within a small range, such as within a ten-foot by ten-foot area, is acceptable. When a user carrying a PID approaches a PC, a sensor of the PID Tracking Apparatus 106 detects the customer's PID, thereby ascertaining the identity of the user. The Activity Server 18 then logs the user in to the PC and presents the user with a personalized welcome message on the PC monitor. When the user moves away from the PC, PID Tracking Apparatus 106 similarly detects that the user has left the PC, and the Activity Server 18 automatically logs the user out. When the user approaches a second PC, the Activity Server 18 automatically logs the user into the second PC and presents the user with same screen displays as when he left the previous PC. Thus, switching from one PC to another does not disrupt the user's interaction with the Entertainment System 22.

As described hereinabove, a PC may be either single-user or shared access. The PID Tracking Apparatus 106 thus resolves the positions of users situated near a single-user PC so that only a single user can log into the single-user PC at any time. Shared access stations accept multiple simultaneous log-ons, so the PID Tracking Apparatus 106 recognizes and logs in all users who are in the viewing area, i.e. within a prescribed distance, of such a shared access station.

The software of the Shared Activity Platform 84 include software running on the Activity Server 18 and software running on the network of PCs 96, both of which use industry standard protocols and application environments for maximum operability. For example, each PC runs Web client software, such as Netcape™ Navigator, and preferably distributed language software as well, such as Java language software. Web client and Java language software allow the PCs to interact in collaborative activities such as a team game, a group puzzle, or a group performance. Web client software is a known and increasingly popular PC interface, so a PC running web client software would provide a user with a familiar "look and feel". Furthermore, Web client software is an emerging software standard because it provides a generic, cross-platform environment. Platform independence assures that the entertainment system 22 receives an evolving body of add-on system components from numerous software and hardware developers.

Figure 8:
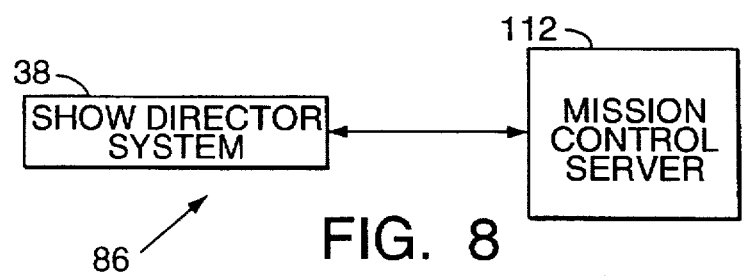
FIG. 8 is a schematic illustration of components of a Mission Control subsystem of the User Interface of FIG. 6.

Referring to FIG. 8, the Mission Control subsystem 86, comprising real-time software running on a Mission Control server 112, is an interface through which the operator 12 controls a show in progress. Although a show normally runs autonomously, it may be occasionally necessary for the operator 12 to intervene. The Mission Control subsystem 86 is in signal communication with the Show Director System 38, reports on the operational status of the show, prompts the operator 12 to take action in support of the show (i.e. put a video into the video tape player 50), and interrupts the show in the event of an emergency or other operational anomaly. Thus, the Mission Control subsystem 86 is a valuable tool for overriding normal show operation.

The host character comprises an image, preferably an image in the form of a person, and an associated host "intelligence" which operates in accordance with artificial intelligence algorithms to present the host image to the user, to provide host feedback to the user and to receive input from the user. The host image is typically a computer-generated image which is based on an actual performance by an actor. The actor performs in a room separate from the audience, where he is filmed and his image shown to the audience on the main screen 56. The image of the host may be shown "live" to the audience, i.e. while the actor is performing, or may be a recorded performance which is stored and shown to the audience after the actor has performed. The performance of a host may furthermore be completely computer generated, and not based on a recording of an actor's performance.

The Master of Ceremonies subsystem 88 supports generation of the host by detecting the motion of an actor and providing the actor with reference information via teleprompting and video feedback of the audience and main screen 56. In the preferred embodiment, there are several actors who play a host. A set of actors may play a host in an entertainment system which is located in one city, while another set of actors play a host in an entertainment system which is located in another city. Each actor in a city can take a turn performing during a show. Given the great number of actors which can participate in performing, it is desirable that all images of actors have "personality consistency", i.e. similar characteristics, to enhance their memorability and appeal to the audience. Though it may be possible to simply train all actors to have similar characteristics, such as walk a certain way and learn numerous gestures, it is preferable to overlay desirable characteristics on top of an actor's natural motion.

Figure 9:
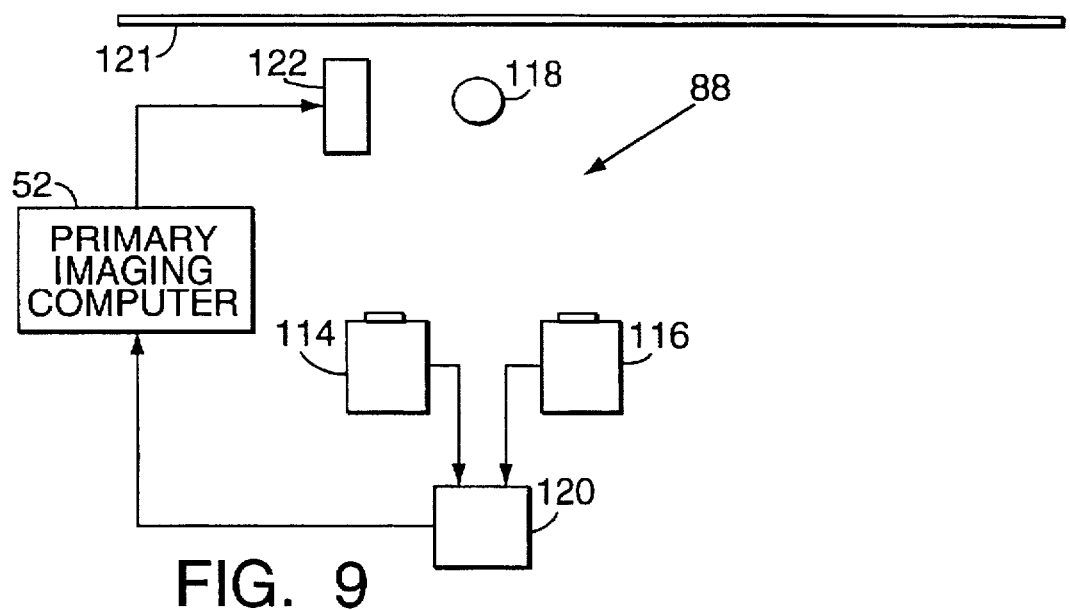
FIG. 9 is a schematic illustration of components of a Master of Ceremonies subsystem of the User Interface of FIG. 6.

Accordingly, FIG. 9 shows the Master of Ceremonies subsystem 88 which comprises two motion capture rigs 114 and 116, both of which are imaging cameras for sensing the motions of an actor 118. In the preferred embodiment, the actor 118 wears a motion-capture suit (not shown) which illuminates key points on the actor's body, such as the joints of the actor. A motion capture suit typically includes light emitting diodes (LEDs) for illuminating the actor's joints. The rigs 114 and 116 detect the LEDs, and therefore detect the joints. Of course, other mechanisms can detect joints, such as The Master of Ceremonies subsystem 88 further comprises software (not shown) running on a computing platform 120. The computing platform 120, which is typically a Silicon Graphics Onyx class computer, receives from the rigs 114 and 116 signals indicative of the images of the joints, and generates in real-time and in dependence thereupon signals indicative of a three-dimensional image (not shown) of the actor 118. Signals indicative of the image of the actor 118 are presented to the Primary Imaging Computer 52 as a channel of the computer-generated world.

As described hereinabove, the image of the actor may be presented in real-time, i.e. shown as the actor performs, or may be stored and shown later. Preferably, the actor is photographed against a blue screen backdrop 121 to distinguish the lights from the motion-capture suit from any background images such as objects behind the actor 118. The computing platform 120 enhances the image of the motion-capture suit LEDs so that the resulting host image has certain recognizable characteristics, such as a special "strut" or various "signature" gestures. Personality consistency is further desirable in that it facilitates the establishment of well-known characters. A user may see different shows performed by different actors, but the images of the actors will have the same recognizable characteristics, making the hosts seem identical.

The actor 118 receives visual feedback by a computer monitor 122 which displays the computer-generated world and the host image therein. The actor 118 uses the feedback to interact with objects in the computer-generated world, making the actor 118 appear to be a part of the computer-generated world. For example, a computer-generated world in a show may comprise the host, whose image is generated in dependence on the filmed actor, and a computer-generated object such as a baseball. The actor can cause the host to pick up the baseball by reaching out in a direction which the host must reach to contact the baseball. The actor determines the proper direction by observing the world on the computer monitor. Though there is, in fact, no physical object at the location where the actor reaches, the computer-generated image of the host, which mimics the actions of the actor, reaches out to the computer-generated baseball.

It is further preferred that the actor need not perform continually during a show. At times a "live" host is not necessary, and so the actor puts the character image in an autonomous loop. The character image performs based on pre-recorded animation sequences stored in the Database 16. The host also has different operational "modes" which are preferably characterized in emotional terms, such as "excited" or "sad". Software control of the operational modes allows the host to "react" to events, i.e. command the host to "watch the football game and get excited when the Dolphins score". By employing personality consistency and programmable host operational modes, the host performs new actions with each show but at the same time the host remains consistent and familiar in appearance.

The host image may be a computer-generated image which depends on the motions of an actor, as described hereinabove, or may be an image which is completely computer-generated without recording an actor's motions. For example, it may be desirable to display only the head of the host. The image of the head is simpler than an image of the entire host, and can be rendered by the computational platform based on a signals indicative of a preferred image of the head and simple algorithms which cause the mouth of the image to move. Accordingly, the computational platform 120 can generate the image of the head without the need to film the motions of an actor.

The host interacts with one or more users of the entertainment system 22 by providing feedback to each user and receiving input from each user. The host provides such feedback as answers to user inquiries, and receives input such as user requests. Because the host is computer-generated, the host may interact simultaneously with each of a plurality of users through a plurality of host images. Each separate host image may operate in parallel with and separate from the other host images. For example, a first user may watch an image of the host on the main screen, while a second user disregards the host image on the main screen and interacts with the host via a PC. In general, the host image shown on the PC perform actions which are different than those performed by the host image on the main screen. A user may initiate interaction with a host image on his PC, such as by requesting information or responding to a request from the host image on the main screen. The host image shown on the main screen is typically based on the movements of an actor, as described hereinabove. The host images shown on PCs are typically completely computer-generated without depending on the movements of an actor. However, in an alternate embodiment of the present invention the host images shown on PCs are generated based on the movements of an actor or even a plurality of actors. An example of user interaction with the host is described hereinbelow.

Figure 10:
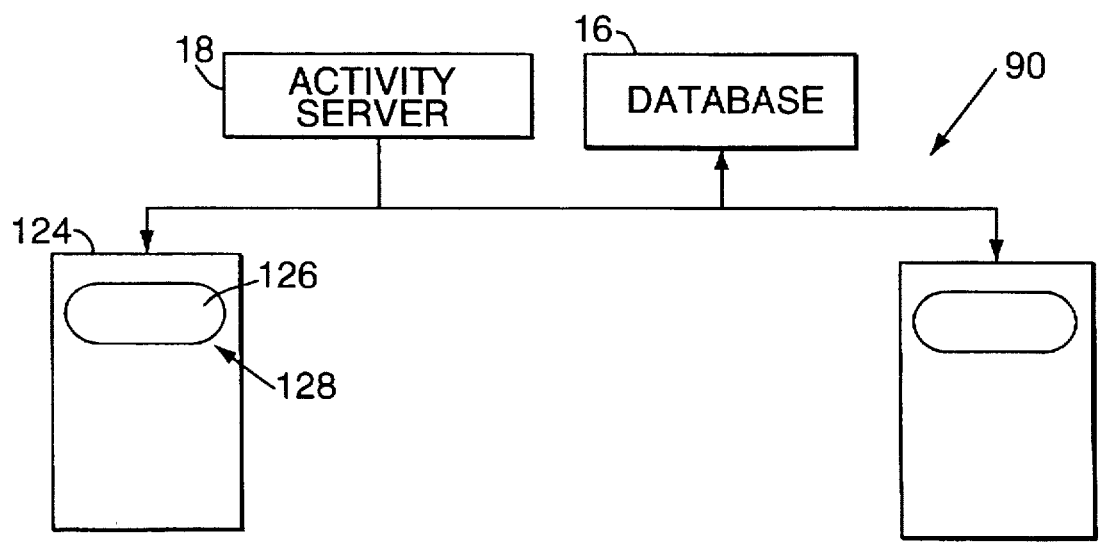
FIG. 10 is a schematic illustration of network of information kiosks.

FIG. 10 shows a network of information kiosks 90 for providing information about shows and for receiving required registration information from a user who wishes to enter a show. The kiosks are preferably situated throughout a site which houses the Entertainment system 22, in locations such as near entrances and waiting areas. Each kiosk comprises a booth 124 with a computer monitor 126 for displaying information and receiving feedback from a user through a touch screen 128 mounted on the monitor 126. In alternate embodiments, each kiosk receives user information from a keyboard or trackball mounted below the monitor 126. The received registration information is presented to the Database 16 for storage. Each kiosk is in signal communication with the Activity Server 18, allowing the kiosk to display live video received from outside sources. Each kiosk also displays internally-generated graphics and pre-recorded video from a storage device (not shown) inside the Kiosk booth, such as a computer hard drive or optical disk.

Referring again to FIG. 6, the Editing system 82 comprises a Shared Template Library 92 and a Content Development and Mapping system. The Show Template Library 92 comprises software running on a computing platform which, much like a newspaper layout, defines a format of a show but not content which is arranged in that format. The Show Template Library 92 specifies a layout and an overall performance, i.e. sequencing, of the show, such as the actions taken by the Audio Assembly, the Lighting Assembly, and the PCs. The Show Template Library software defines a prescribed process for receiving content signals indicative of informational items, i.e. content, and for relating and configuring the content signals into an arrangement known as a template. The template and content together comprise a show.

The Shared Template Library 92 comprises template software running on a computing platform, typically on the Activity Server 18. The template software defines a template, wherein a template is a prescribed arrangement of content signals, as well as prescribed algorithms for performing portions of a show. Such algorithms which are included in a template may, for example, direct the host to direct questions to a panel of guests, or update a list of football player statistics as a football game progresses. The algorithms are independent of the actual content, such as the specific questions to direct to the panel of guests or the actual football player statistics. The template software accepts subsequent signal entries which are indicative of additional templates. Signals indicative of each template are stored and accessible in a conventional manner through database retrieval tools.

The Content Development and Mapping system 94 inserts content signals into a template for each show. The operator 12 uses the Content Development and Mapping system 94 to "program" shows. For example, a weekly show may utilizes a single template, but different content is inserted into that template for each show. New content may be, for example, signals indicative of new video clips taken from the week's news, new questions and answers for a game show or new celebrities to be interviewed on a talk show.

The Content Development and Mapping system 94 comprises software running on a computing platform, typically on the Activity Server 18. The software of the Content Development and Mapping system 94 defines informational items, known as content, to be inserted into a template. The software accepts subsequent signal entries which are indicative of new content. Signals indicative of each informational item are stored and accessible in a conventional manner through database retrieval tools.

Though the Editing system 82 is used for creating a show, it also exerts control over components of the entertainment system 22 which are active during a show performance. For example, during the final stages of show creation, the Editing system 82 controls the Giant Display Assembly 40, Audio Assembly 42, and Lighting Assembly 44 to aid the operators in evaluating the show and assuring that the show will perform as intended.

Figure 12:
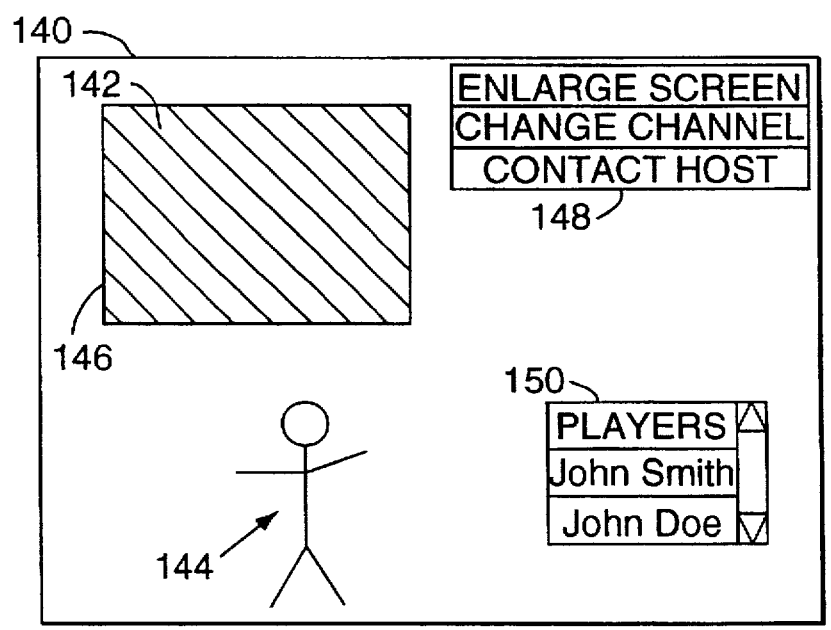
FIG. 12 is a schematic illustration of a show incorporating a live broadcast.

An example of a show is represented by FIG. 12. Illustrated therein is a show presented by the entertainment system 22 involving a weekly football performance. The show is one of a series of shows which have different content but the same template. An image of a weekly show 140 implemented by the entertainment system 22 incorporates a conventional football game broadcast 142 as well as an image of a host 144. The football game broadcast 142 is shown in a small window 146 within the image of the show 140. During the show, the audience (not shown) may perform a game-related activity which is associated with events of the football game. The audience presents input to and receives output from the entertainment system 22 through an on-screen menu 148 and an on-screen selection list 150. Other computer-generated on-screen interface items besides menus and selection lists may be included as well, such as on-screen buttons and dials. Game related activities may include researching players statistics on an "NFL World Wide Web Home Page" and predicting the football players' performances during the game. In the foregoing example, the small window 146, the menu 148, the selection list 150 and algorithms indicative of the game-related activity comprise a template, while the particular broadcast event (the football game), the players names for the selection list and the NFL web page information are content that is "mapped" to the template.

Figure 13:
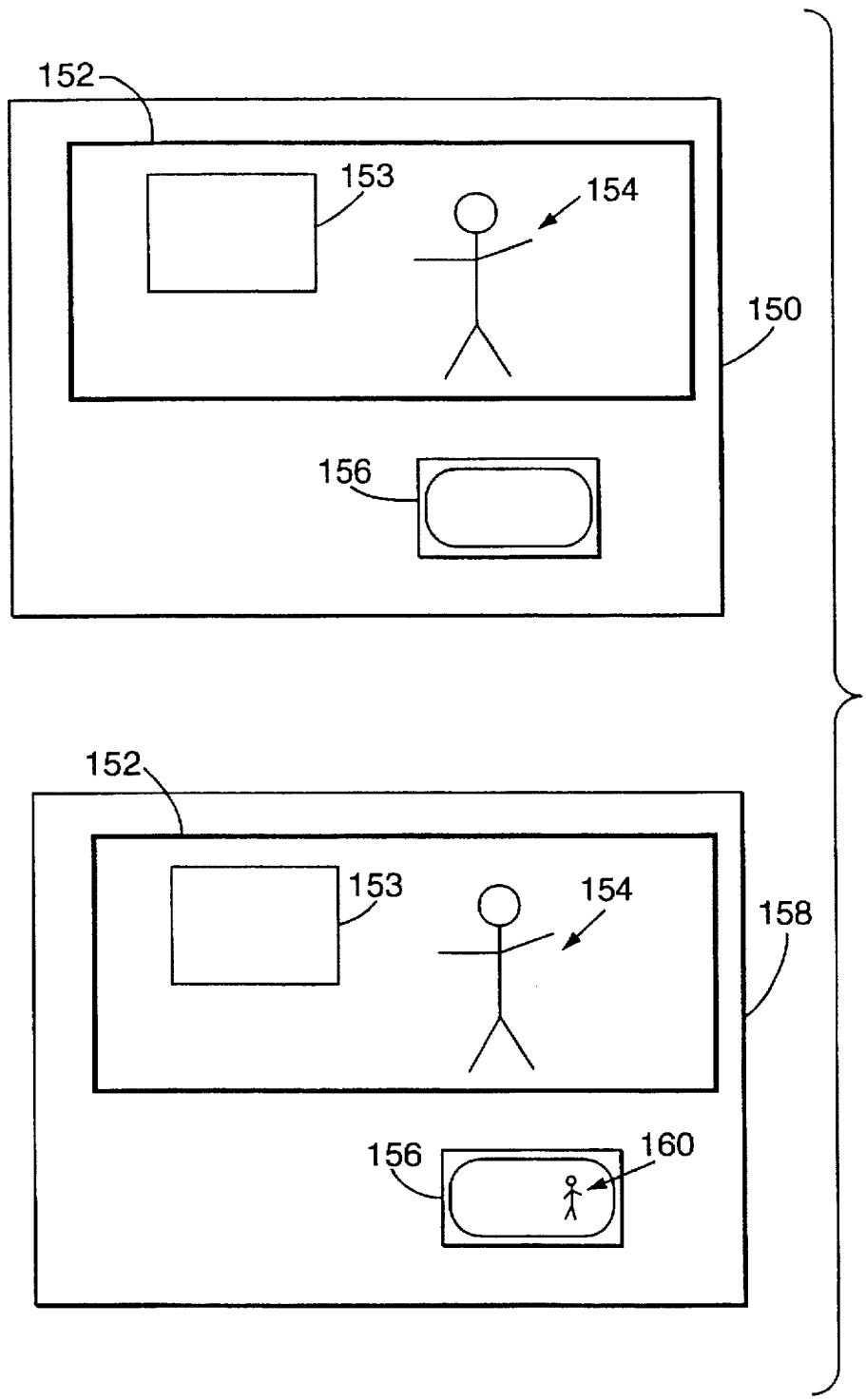
FIG. 13 is a schematic illustration depicting a user interacting with a host.

An example depicting a user interacting with a host is illustrated in FIG. 13. In frame 150 of FIG. 13, a main screen 152 shows a first image 154 of the host, while a PC 156 is inactive and displays no images. The first image 154 on the main screen 152 is involved in entertaining an entire audience (not shown), for example, by questioning a panel of guests on a talk show (not shown) who are on a virtual display 153 within the main screen 152. In frame 158, which represents a time subsequent to that of frame 150, the main screen 152 continues to show the host image 154 to the audience. However, a user (not shown) has logged into the PC 156, and the PC 156 now shows a second image 160 of the host. The second image 160 of the host does not mirror the actions of the first image 154. Instead, second image 160 performs independently of the first image 154, and responds to user inquiries entered through the PC 156. For example, the user may ask the second image 160 of the host how to access the Internet from the PC, and the second image 160 responds with graphical and auditory feedback via the PC 156. As show by the above example described in FIG. 13, a new host image is generated "on demand" in response to user actions. Furthermore, each host image acts like a live person, though a host image may in fact be computer generated and not indicative of the actions of a live actor.

The hereinabove-described computing platforms are connected by a network comprising a plurality of "fast Ethernet" networks, each operating at 100 mbit/second, connected by a faster "backbone" network linkage. In the preferred embodiment, the network employs a conventional high-bandwidth protocol, such as ATM or FDDI. In addition, the network supports partial T3 Internet access to allow connection to a global network of computers, such as the Internet, for distance interaction.

Although the invention has been shown and described with respect to a preferred embodiment thereof, it would be understood by those skilled in the art that other various changes, omissions and additions thereto may be made without departing from the spirit and scope of the present invention.

For example, interactive computer systems often comprise primary systems and backup systems. If a primary system fails, a backup system automatically engages to perform the functions of the failed primary system. It is especially important in an interactive system which utilizes audio and visual feedback that the transition between primary and backup system be seamless and indiscernible, otherwise discontinuities or gaps are noticeable to a viewer of the primary system. Each of the systems described herein may employ at least one additional backup system to provide continuous operation in the event of a hardware or software failure.

Furthermore, the Entertainment system 22 provided in accordance with the present invention can easily interact with users via a global computer network, such as the World Wide Web (WWW). An interactive WWW site, i.e. a home page, allows remote access to games and other activities which are provided to users who are "on location".

What is claimed is:

1. A computer-based entertainment system which interacts with a user who has user characteristics, and which presents to the user an interactive show comprising audio, video images and computer-generated graphical images, the entertainment system comprising:

user interface means for receiving user input signals indicative of user input actions, and further for presenting user output signals to the user, which user output signals are indicative of the audio, video and computer graphical images generated by output devices;

database means for receiving said user input signals and for generating in dependence thereupon database signals which are indicative of an informational record of the user, which informational record is indicative of user characteristics;

show controller for generating a first set of show control signals indicative of the audio, the video images and the computer-generated graphical images of the show; and activity server means for receiving said user input signals, said database signals and said first set of show control signals, and for generating in dependence thereupon activity server signals for directing presentation of said user output signals by said user interface means, and wherein said activity server signals are presented to said show controller and, in dependence thereon, said show controller generates a second set of show control signals indicative of the audio, the video images and the computer-generated graphical images of the show which are adjusted in accordance with said user input actions.

2. The system of claim 1, wherein said user interface means further comprises:

a computer system having:

a monitor for presenting a subset of said user output signals which are indicative of video and computer graphical images to the user, a speaker for presenting a subset of said user output signals which are indicative of audio to the user, and an input device for receiving said user input signals, and wherein said computer system receives signals said user output signals from the activity server.

3. The system of claim 2, wherein said user interface means further comprises:

a personal interaction device for generating proximity signals indicative of a location and an identity of the user;

a proximity sensor for receiving said proximity signals, for generating in dependence thereupon signals indicative of said location and said identity of the user, and for presenting to said activity server said signals indicative of said location and said identity of the user;

and wherein said user output signals and said user input signals are generated in accordance with said location and said identity of the user.

4. The system of claim 1, wherein said show controller comprises:

giant display means for generating an image of the show upon a screen;

audio means for generating sound of the show through a speaker;

lighting means for illuminating the show.

5. The system of claim 4, wherein said giant display means comprises:

imaging means for generating graphics signals indicative of computer graphical images; and projector means for receiving said graphics signals and for projecting an image upon said screen in accordance with said graphics signals.

6. The system of claim 5, wherein said giant display means further comprises:

a video mixing station for generating video signals indicative of a prescribed video image; and wherein said imaging means receives said video signals and generates in dependence thereupon graphics signals indicative of said video image and said computer graphical images.

7. The system of claim 6, wherein said video mixing station further for generating video signals indicative of a plurality of prescribed video images which are in a prescribed arrangement with respect to each other.

8. The system of claim 1, wherein said user interface, means comprises master of ceremonies means comprising:

an imaging camera for generating a first set of actor image signals indicative of a position and movement of an actor;

a computing platform for receiving said actor image signals, and further for generating in dependence thereupon a first set of host image signals indicative of a three-dimensional graphical image of said actor.

9. The system of claim 1, wherein said activity server means generates said first set of activity server signals in dependence upon template signals and content signals, wherein said content signals are indicative of prescribed audio, video images and computer-generated graphical images of the show, and wherein said template signals are indicative of a prescribed arrangement of said audio, video images and the computer-generated graphical images and prescribed algorithms for performing portions of the show.

10. A method for interacting with a user of an entertainment system, in which the user has user characteristics, and which entertainment system presents to the user an interactive show comprising audio, video images and computer-generated graphical images, the method comprising the steps of:

receiving user input signals indicative of user input actions;

presenting user output signals to the user, which user output signals are indicative of the audio, video and computer graphical images generated by output devices;

generating, in dependence upon said user input signals, database signals which are indicative of an informational record of the user, which informational record is indicative of user characteristics;

generating a first set of show control signals indicative of the audio, the video images and the computer-generated graphical images of the show;

receiving said user input signals, said database signals and said show control signals, and generating in dependence thereupon activity server signals for directing presentation of said user output signals by said user interface means; and generating, in dependence upon said activity server signals, a second set of show control signals indicative of the audio, the video images and the computer-generated graphical images of the show which are adjusted in accordance with said user input actions.

11. A computer-based entertainment system which presents to a plurality of users an interactive show comprising audio, video images and computer-generated graphical images, the entertainment system comprising:

a host comprising host image signals indicative of graphical images and host intelligence signals indicative of artificial intelligence algorithms for presenting said host image signals to the plurality of users, for receiving input signals from the plurality of users and for providing host feedback signals to the plurality of users;

imaging computer means for generating said host image signals;

activity server means for generating said host intelligence signals, and further for generating signals indicative of the interactive show in dependence on said input signals and in accordance with a prescribed algorithm; and a shared activity platform comprising a plurality of computing platforms, each computing platform for receiving input signals from a user of the plurality of users and for presenting output signals indicative of the interactive show to the user, wherein a subset of said output signals comprises said host image signals and said host feedback signals, wherein a first computing platform presents a first set of host image signals to a first user and a second computing platform presents a second set of host image signals to a second user.

12. The entertainment system of claim 11, wherein said first computing platform presents said first set of host image signals and said second computing platform presents said second set of host image signals simultaneously.

13. The entertainment system of claim 11, wherein said a third set of host image signals are presented on a projection screen.

14. The entertainment system of claim 11, wherein said first computing platform receives a first set of input signals and said second computing platform receives a second set of input signals simultaneously.

15. An method for interacting with a plurality of users an entertainment system, which entertainment system presents to the plurality of users an interactive show comprising audio, video images and computer-generated graphical images, the method comprising the steps of:

generating host image signals indicative of graphical images generating host intelligence signals indicative of artificial intelligence algorithms for presenting said host image signals to the plurality of users, for receiving input signals from the plurality of users and for providing host feedback signals to the plurality of users;

generating signals indicative of the interactive show in dependence on said input signals and in accordance with a prescribed algorithm; and receiving a first set of input signals from a first user at a first computing platform;

receiving a second set of input signals from a second user at a second computing platform;

presenting output signals indicative of the interactive show to the plurality of users, wherein a subset of said output signals comprises said host image signals and said host feedback signals;

presenting a first set of host image signals to a first user at a first computing platform; and presenting a second set of host image signals to a second user at a second computing platform.

16. The method of claim 15, wherein said steps of presenting a first set of host image signals and presenting a second set of host image signals occur simultaneously.

17. The method of claim 15, further comprising the step of presenting a third set of host image signals on a projection screen.

18. The method of claim 15, wherein said steps of receiving a first set of input signals and receiving a second set of input signals occur simultaneously.

19. A computer-based entertainment system which presents to a plurality of users an interactive show comprising audio, video images and computer-generated graphical images, wherein each user has user characteristics, the entertainment system comprising:

database means for storing database signals indicative of the user characteristics and for selectively presenting a subset of said database signals in response to received database inquiry signals;

activity server means for generating output signals indicative of the interactive show in dependence on said database signals and in accordance with a prescribed algorithm, and further for receiving input signals indicative of user input actions; and a shared activity platform comprising a plurality of computing platforms, each computing platform for receiving said input signals from a user of the plurality of users and for presenting said output signals to the user, wherein a first computing platform presents a first set of said output signals to a first user and a second computing platform presents a second set of said output signals to a second user, which first set of said output signals are generated in dependence on a first set of database signals indicative of user characteristics of said first user, which second set of said output signals are generated in dependence on a second set of database signals indicative of user characteristics of said second user, and wherein said first computing platform receives a first set of said input signals from said first user and said second computing platform receives a second set of said input signals from said second user.

20. A method for interacting with a computer-based entertainment system which presents to a plurality of users an interactive show comprising audio, video images and computer-generated graphical images, wherein each user has user characteristics, the method comprising the steps of:

storing database signals indicative of the user characteristics;

selectively presenting a subset of said database signals in response to received database inquiry signals;

generating output signals indicative of the interactive show in dependence on said database signals and in accordance with a prescribed algorithm;

receiving a first set of said input signals indicative of user input actions from said first user at said first computing platform;

receiving a second set of said input signals indicative of user input actions from said second user at said second computing platform;

presenting a first set of said output signals to a first user at a first computing platform, which first set of said output signals are generated in dependence on a first set of database signals indicative of user characteristics of said first user; and presenting a second set of said output signals to a second user at a second computing platform, which second set of said output signals are generated in dependence on a second set of database signals indicative of user characteristics of said second user.

* * * * *